(12) United States Patent
Kawasaki

(10) Patent No.: US 12,543,717 B2
(45) Date of Patent: Feb. 10, 2026

(54) LURE

(71) Applicant: Shimano Inc., Osaka (JP)

(72) Inventor: Tatsurou Kawasaki, Osaka (JP)

(73) Assignee: Shimano Inc., Osaka (JP)

( * ) Notice: Subject to any disclaimer, the term of this patent is extended or adjusted under 35 U.S.C. 154(b) by 117 days.

(21) Appl. No.: 17/745,167

(22) Filed: May 16, 2022

(65) Prior Publication Data

US 2022/0378027 A1 Dec. 1, 2022

(30) Foreign Application Priority Data

Jun. 1, 2021 (JP) .................. 2021-092268

(51) Int. Cl.
*A01K 85/16* (2006.01)
*A01K 85/00* (2006.01)

(52) U.S. Cl.
CPC .......... *A01K 85/1851* (2022.02); *A01K 85/16* (2013.01); *A01K 85/1837* (2022.02); *A01K 85/1847* (2022.02)

(58) Field of Classification Search
CPC ........ A01K 85/16; A01K 85/18; A01K 85/00; A01K 85/1847; A01K 85/1851; A01K 85/026; A01K 85/027; A01K 85/028
USPC ........... 43/42.48, 42.36, 42.35, 34–37, 42.72
See application file for complete search history.

(56) References Cited

U.S. PATENT DOCUMENTS

| | | | | |
|---|---|---|---|---|
| 810,017 A * | 1/1906 | Ackerman | ............. | A01K 85/16 43/42.39 |
| 1,172,780 A * | 2/1916 | Ferree | .................... | A01K 85/02 43/35 |
| 1,390,458 A * | 9/1921 | Moree | .................... | A01K 85/16 43/42.48 |
| 1,670,174 A * | 5/1928 | Wiersma | ................ | A01K 85/16 43/37 |
| 1,842,591 A * | 1/1932 | Dunkelberger | ........ | A01K 85/16 43/42.22 |
| 1,869,111 A * | 7/1932 | Mclaughlin | ............ | A01K 85/02 43/42.3 |
| 1,871,387 A * | 8/1932 | Pflueger | ................. | A01K 85/16 43/42.39 |
| 2,041,634 A * | 5/1936 | Boyko | ................... | A01K 85/00 43/35 |
| 2,295,292 A * | 9/1942 | Rogers | ................... | A01K 85/16 43/42.34 |

(Continued)

FOREIGN PATENT DOCUMENTS

AU 2017354932 A1 * 2/2019 ............ A01K 85/16
CN 217547045 U * 10/2022
(Continued)

*Primary Examiner* — Darren W Ark

(74) *Attorney, Agent, or Firm* — Spencer Fane, LLP

(57) ABSTRACT

A lure for fishing includes a hollow body including a first body having a first bonding surface and a second body having a second bonding surface bonded to the first bonding surface, a wire having an eye to which a line or a hook is configured to be connected, and integrally incorporated into the body, and a buffer member between the body and the wire. The wire is sandwiched between the first body and the second body with the buffer member interposed therebetween such that the eye is exposed to outside of the body, and is configured to move relative to the buffer member. The buffer member is in contact with both the first body and the second body.

10 Claims, 8 Drawing Sheets

(56) References Cited

U.S. PATENT DOCUMENTS

| | | | | |
|---|---|---|---|---|
| 2,307,200 A * | 1/1943 | Cullerton | A01K 85/16 | 43/42.49 |
| 2,570,100 A * | 10/1951 | Collins | A01K 85/16 | 43/42.35 |
| 2,603,902 A * | 7/1952 | Stanwyck | A01K 85/16 | 43/42.36 |
| 2,609,633 A * | 9/1952 | Cracker | A01K 85/16 | 43/42.36 |
| 2,611,207 A * | 9/1952 | Pond | A01K 85/16 | 43/42.47 |
| 2,611,209 A * | 9/1952 | Pond | A01K 85/16 | 43/42.48 |
| 2,733,535 A * | 2/1956 | Rosen | A01K 85/16 | 43/42.34 |
| 2,854,778 A * | 10/1958 | Polki | A01K 85/02 | 43/35 |
| 2,896,355 A * | 7/1959 | Dean | A01K 85/02 | 43/35 |
| 2,933,846 A * | 4/1960 | Garner | A01K 85/16 | 43/42.49 |
| 2,986,838 A * | 6/1961 | Smyser | A01K 85/16 | 43/42.49 |
| 3,006,102 A * | 10/1961 | Chapman | A01K 85/00 | 43/42 |
| 3,026,645 A * | 3/1962 | Burnett | A01K 83/02 | 43/37 |
| 3,091,883 A * | 6/1963 | Hufford | A01K 85/16 | 43/42.36 |
| 3,218,749 A * | 11/1965 | Dow | A01K 85/02 | 43/42.04 |
| 3,492,753 A * | 2/1970 | Armond | A01K 85/02 | 43/37 |
| 3,541,718 A * | 11/1970 | Norman | A01K 85/16 | 43/42.35 |
| 3,802,114 A * | 4/1974 | Diebold | A01K 85/02 | 43/37 |
| 3,805,436 A * | 4/1974 | Davis | A01K 85/16 | 43/42.42 |
| 3,877,168 A * | 4/1975 | Stevens | A01K 85/01 | 43/42.34 |
| 3,965,606 A * | 6/1976 | Bingler | A01K 85/00 | 43/43.13 |
| 4,064,646 A * | 12/1977 | Vercellone | A01K 85/16 | 43/42.41 |
| 4,073,084 A * | 2/1978 | Favron | A01K 85/16 | 43/42.35 |
| 4,112,608 A * | 9/1978 | McGahee | A01K 85/16 | 43/42.09 |
| 4,211,027 A * | 7/1980 | Viscardi | A01K 85/16 | 43/42.24 |
| 4,216,605 A * | 8/1980 | Showalter | A01K 85/16 | 264/46.7 |
| 4,242,827 A * | 1/1981 | Smith | A01K 85/16 | 43/42.22 |
| 4,278,231 A * | 7/1981 | McGahee | B29C 45/14 | 249/97 |
| 4,437,257 A * | 3/1984 | Kluge | B29C 44/42 | 264/46.7 |
| 4,477,994 A * | 10/1984 | Erickson | A01K 85/16 | 43/42.48 |
| 4,760,665 A * | 8/1988 | Stueber | A01K 83/02 | 43/36 |
| 4,761,910 A * | 8/1988 | Ninomiya | A01K 85/16 | 43/42.22 |
| 4,765,084 A * | 8/1988 | Braden | A01K 85/16 | 43/34 |
| 4,980,987 A * | 1/1991 | Ramsey, Sr. | A01K 85/02 | 43/34 |
| 5,233,785 A * | 8/1993 | Ching | A01K 85/16 | 43/42.36 |
| 5,477,634 A * | 12/1995 | Welcome | A01K 85/16 | D22/133 |
| 5,596,831 A * | 1/1997 | McWethy, Jr. | A01K 85/00 | 43/42.36 |
| 6,006,465 A * | 12/1999 | Brown | A01K 85/00 | 43/42.36 |
| 6,058,645 A * | 5/2000 | Lummis | A01K 85/16 | 43/42.33 |
| 6,101,758 A * | 8/2000 | Finley | A01K 85/16 | 43/42.22 |
| 6,711,848 B1 * | 3/2004 | Gammieri | A01K 85/16 | 43/37 |
| 6,868,632 B1 * | 3/2005 | Heck | A01K 85/02 | 43/37 |
| 8,627,594 B1 * | 1/2014 | Weron | A01K 85/16 | 43/42.32 |
| 9,538,735 B1 * | 1/2017 | Rider | A01K 85/00 | |
| 11,653,638 B2 * | 5/2023 | Fox | F16B 2/005 | 43/44.89 |
| 11,684,052 B1 * | 6/2023 | Walsh, Jr. | A01K 83/02 | 43/35 |
| 2001/0029692 A1 * | 10/2001 | Imamura | A01K 85/16 | 43/42.36 |
| 2002/0174593 A1 * | 11/2002 | Siirtola | A01K 85/16 | 43/42.53 |
| 2004/0025406 A1 * | 2/2004 | Kato | A01K 85/16 | 43/42.24 |
| 2007/0180756 A1 * | 8/2007 | McHone | A01K 85/02 | 43/26.2 |
| 2010/0058644 A1 * | 3/2010 | Wulf | A01K 85/02 | 43/35 |
| 2012/0266517 A1 * | 10/2012 | Burdick | A01K 85/18 | 43/42.09 |
| 2012/0272563 A1 * | 11/2012 | Baker | A01K 85/18 | 43/42.22 |
| 2012/0324778 A1 * | 12/2012 | Choi | A01K 85/00 | 43/42.22 |
| 2015/0089858 A1 * | 4/2015 | Burdick | A01K 85/16 | 43/42.09 |
| 2016/0157471 A1 * | 6/2016 | Leppala | A01K 85/16 | 43/42.22 |
| 2018/0000057 A1 * | 1/2018 | Jarboe, Jr. | A01K 85/01 | |
| 2019/0082667 A1 * | 3/2019 | Gamache | A01K 85/01 | |
| 2019/0261614 A1 * | 8/2019 | Olsen | A01K 85/1843 | |
| 2019/0269112 A1 * | 9/2019 | Olson | A01K 85/16 | |
| 2019/0320634 A1 * | 10/2019 | Kawasaki | A01K 85/16 | |
| 2021/0274762 A1 * | 9/2021 | Yagi | A01K 85/01 | |
| 2021/0274763 A1 * | 9/2021 | Yagi | A01K 85/01 | |
| 2021/0307307 A1 * | 10/2021 | Deaton | A01K 85/16 | |
| 2022/0061280 A1 * | 3/2022 | Nakamichi | A01K 85/01 | |
| 2022/0132820 A1 * | 5/2022 | Willey | A01K 95/00 | 43/42.39 |
| 2022/0217958 A1 * | 7/2022 | Olsen | A01K 85/1863 | |
| 2023/0031006 A1 * | 2/2023 | Yagi | A01K 85/012 | |
| 2023/0301283 A1 * | 9/2023 | Renosky | A01K 85/18 | |
| 2024/0324565 A1 * | 10/2024 | Jansen | A01K 85/1837 | |

FOREIGN PATENT DOCUMENTS

| | | | |
|---|---|---|---|
| DE | 1657090 A1 * | 2/1971 | |
| DE | 10 2019 205 734 A1 | 10/2019 | |
| DE | 10 2021 205 401 A1 | 12/2021 | |
| FR | 1422333 A * | 12/1965 | |
| FR | 2835149 A3 * | 8/2003 | A01K 85/16 |
| JP | 2005102582 A * | 4/2005 | |
| JP | 2008148668 A * | 7/2008 | |
| JP | 3184551 U * | 7/2013 | |
| JP | 2014217289 A * | 11/2014 | |
| JP | 2015039352 A * | 3/2015 | |
| JP | 2015047137 A * | 3/2015 | |
| JP | 2017139966 A * | 8/2017 | |
| JP | 2020191816 A * | 12/2020 | |
| JP | 2021061795 A * | 4/2021 | |
| JP | 2021061798 A * | 4/2021 | |
| JP | 2021136954 A * | 9/2021 | A01K 85/01 |
| JP | 2021136955 A * | 9/2021 | A01K 85/01 |
| JP | 3243152 U * | 8/2023 | |
| JP | 2024054595 A * | 4/2024 | |
| JP | 2024158561 A * | 11/2024 | |

(56) References Cited

FOREIGN PATENT DOCUMENTS

| KR | 20220083198 A | * | 6/2022 | | |
| WO | WO-9322908 A1 | * | 11/1933 | ............. | A01K 85/16 |
| WO | WO-2011016128 A1 | * | 2/2011 | ............. | A01K 85/16 |

* cited by examiner

LURE

CROSS-REFERENCE TO RELATED APPLICATIONS

This application claims priority to Japanese Patent Application No. 2021-092268, filed on Jun. 1, 2021. The entire disclosure of Japanese Patent Application No. 2021-092268 is hereby incorporated by reference.

BACKGROUND

Field of the Invention

The present invention relates to a lure for fishing.

Background Art

Fishing can use a lure (artificial bait), or lure fishing (lure fishing), instead of bait, or bait fishing, and can be performed in accordance with a target fish and is known from the prior art. A wide variety of such lures are provided in accordance with the target fish, the fishing method, etc., and so-called plug lures, which imitate the shapes of small fish, are also known.

Plug lures are suitable for catching target fish that prey upon small fish (known as fisheaters), examples of which include freshwater fish (e.g., black bass) and saltwater fish (e.g., sea bass and yellowtail amberjack), and are variously used in accordance with differences in action during the winding (reeling) of the fishing line, buoyancy, dive depth (range), etc., for example.

In general, this type of lure primarily includes a first body and a second body that are bonded to each other via a joining surface, thereby constituting a body imitating a small fish, and a wire frame sandwiched between the first body and the second body.

The wire frame is a metal wire made of rustproof material, such as stainless steel, a portion of which is bent, thereby functioning as a line eye to which a line is connected, or a hook eye to which a hook is connected, for example. The wire frame is installed in the body with at least the line eye and the hook eye exposed to the outside.

For example, Japanese Laid-Open Patent Application No. 2005-102582 discloses a lure comprising a body in which a plurality of pins are used to join a first body and a second body, and a wire frame that is incorporated into the body in a state in which the wire frame is exposed to the bottom surface side of the body, where portions of the wire frame function as a line eye and a hook eye. The wire frame is assembled so as to engage with a pin, and be held appropriately thereby against the body.

Utility Model Registration No. 3184551 discloses a lure comprising a body in which a plurality of pins are used to combine a first body and a second body, a weight-receiving portion formed in a part of the bonding surface of the first body and the bonding surface of the second body located at a tail portion (caudal fin portion) of the body, and a wire frame that is installed in the body with portions of the wire frame functioning as a line eye and a hook eye. The wire frame is assembled so as to engage with a pin and is appropriately held against the body. In addition, a weight, which is fitted into the weight-receiving portion, is integrally formed with the wire frame.

SUMMARY

In general, if, when using a plug lure, there has been a strike (strike by a fish), the external force from the target fish is transmitted to the hook eye through the hook, so that the hook eye tends to strongly press against the body. At this time, since the wire frame including the hook eye is arranged between the first body and the second body, if a large external force is transmitted to the hook eye through the hook, the hook eye momentarily or continually forcefully presses against the body. As a result, it is possible that the hook eye will split the body in two, tearing apart the bonding surface of the first body and the bonding surface of the second body.

The same applies to the lure disclosed in Japanese Laid-Open Patent Application No. 2005-102582, for example, and the hook eye located at the tail portion of the body is fitted inside a receiving groove formed on the bonding surface of the first body and the bonding surface of the second body. As a result, when an external force from a target fish is applied to the hook eye located at the tail portion of the body, the hook eye strongly presses against the body so as to tear apart the two bonding surfaces. As a result, there is a risk that the body will split in two.

The same applies to the lure disclosed in Utility Model Registration No. 3184551; the hook eye located at the tail portion of the body is fitted, together with the weight, inside the weight-receiving portion formed on the bonding surface of the first body and the bonding surface of the second body. As a result, when an external force from the target fish is applied to the hook eye located at the tail portion of the body, since the external force is transmitted to the inside of the body via the weight, there is a risk that the body will split in two, tearing the two bonding surfaces apart in the same manner.

Embodiments of the present invention were conceived in light of these circumstances, and an object thereof is to provide a lure that can suppress the transmission of an external force from the wire to the body, even if the external force is transmitted to the wire that includes an eye.

One embodiment of a lure according to the present invention is a lure for fishing, comprising a hollow body composed of a first body having a first bonding surface and a second body having a second bonding surface that is bonded to the first bonding surface, a wire that has an eye to which a line or a hook can be connected and that is integrally incorporated into the body, and a buffer member disposed between the body and the wire, wherein the wire is sandwiched between the first body and the second body with the buffer member interposed therebetween in a state in which the eye is exposed to the outside of the body, and can move relative to the buffer member, and the buffer member is arranged so as to be in contact with both the first body and the second body.

By the lure according to this embodiment of the present invention, a wire having an eye is sandwiched between the first body and the second body via a buffer member disposed to be in contact with both the first body and the second body. As a result, it is possible to use the buffer member to prevent the wire from coming in direct contact with the body (first body and second body). Thus, for example, when there has been a strike, it is possible to prevent the wire from directly pressing against the body, even if an external force is transmitted from the target fish to the eye and the wire moves relative to the body and the buffer member.

Therefore, it is possible to suppress or avoid the occurrence of inconveniences, such as the wire strongly pressing against the body, thereby splitting the body and tearing apart the first bonding surface and the second bonding surface, as in the prior art. That is, it is possible to relax and disperse the external force (external force from the target fish) that is transmitted from the wire to the body via the buffer member. Therefore, since it is possible to prevent the external force from becoming concentrated and being transmitted between the first bonding surface and the second bonding surface, the generation of cracks in the body that can separate the first body and the second body are less likely to occur. Therefore, a lure having long-term stable quality can be obtained.

Since the wire can move relative to the buffer member, the wire can be combined therewith in a state of allowing play of the wire with respect to the buffer member. As a result, it is possible to ensure freedom of movement of the wire including the eye, and, for example, when there has been a strike, the wire can be displaced in accordance with the movement of the target fish. Therefore, a lure with which the target fish does not easily become detached from the hook can be obtained.

The buffer member can have a first buffer portion and a second buffer portion disposed facing each other across the wire, and the wire can be disposed between the first buffer portion and the second buffer portion.

In this embodiment, since the first buffer portion and the second buffer portion are disposed facing each other across the wire, even if an external force from the target fish causes the wire to move relative to the buffer member, the wire is easily brought into contact with the first buffer portion and the second buffer portion. Thus, use of the first buffer portion and the second buffer portion to further prevent the wire from directly pressing against the body is facilitated.

The buffer member can have a connecting portion that connects the first buffer portion and the second buffer portion, and the wire can be arranged in an accommodation space surrounded by the first buffer portion, the second buffer portion, and the connecting portion.

In this embodiment, since the wire can be disposed in the accommodation space surrounded by the first buffer portion, the second buffer portion, and the connecting portion, the buffer member can be disposed to surround the wire. Therefore, even if the wire moves relative to the buffer member due to an external force from the target fish, it is possible to effectively prevent the wire from directly pressing against the body. In addition, since the buffer member can be composed of a single part made up of the first buffer portion, the second buffer portion, and the connecting portion, handling of the buffer member is facilitated, and, for example, assembly of the lure can be performed efficiently.

An external communication hole that is formed surrounding the buffer member and that exposes the eye to the outside from the inside of the body can be formed on the body, a first contacted surface facing the first buffer portion and a second contacted surface facing the second buffer portion can be formed on the inner surface of the external communication hole, a first contact surface that contacts the first contacted surface can be formed on the outer surface of the first buffer portion, and a second contact surface that contacts the second contacted surface can be formed on the outer surface of the second buffer portion.

In this embodiment, since the buffer member is arranged inside the external communication hole in a state in which the first contact portion is in contact with the first contacted surface and the second contact surface is in contact with the second contacted surface, the buffer member can be appropriately combined with the body without shifting position, for example. As a result, such problems as the buffer member turning relative to the body do not readily occur. Therefore, the buffer member can be disposed between the body and the wire in a state in which the orientation of the buffer member is stabilized. Therefore, the buffer member can aptly take on the function of preventing the wire from directly pressing against the body.

The body can have a head portion, an abdominal portion, and a tail portion, and the buffer member can be disposed in at least one of the head portion, the abdominal portion, and the tail portion.

In this embodiment, even when the wire eye is made to function as a line eye to which a line can be connected, a hook eye to which a hook disposed on the abdomen side of the body (so-called front hook) can be connected, or a hook eye to which a hook disposed on the tail side of the body (so-called rear hook) can be connected, the buffer member can be used to prevent the wire from directly pressing against the body, and the external force transmitted from the wire to the body can be relaxed and dispersed.

The wire is sandwiched between the first body and the second body in a state in which the wire is disposed from the head portion to the tail portion via the abdominal portion.

In this embodiment, since the wire is arranged inside the body from the head portion to the tail portion via the abdominal portion, the wire can be sandwiched over a wide range by the first body and the second body, and the wire can be firmly attached to the body.

The buffer member can be fixed to the body.

In this embodiment, since the buffer member is fixed to the body by adhesion or fusion, it is possible to prevent such inconveniences as the buffer member unintentionally sliding or turning relative to the body, thereby changing the orientation of the buffer member, or the buffer member falling off the body.

A swinging part that is movably attached to the body and that has a reflector that reflects light from the outside can be disposed inside the body, and the body can be configured such that light reflected from the reflector can be seen from the outside.

In this embodiment, for example, the swinging part disposed inside the body is capable of swinging, vibrating, for example, by an action, etc., via the line. As a result, the state of the light reflected by the reflector (reflected light) can be changed, thereby changing the way the light appears. Therefore, the lure can appear as if it is shining. Thus, the lure can be made effectively more appealing to the target fish, and easily increase the hit rate with which target fish become hooked to the lure.

The swinging part can be attached to the body via an elastic member and vibrate with respect to the body.

In this embodiment, since the swinging part is attached inside the body via the elastic member, even when action through the line stops, or the movement of the water or tide stops, the swinging part does not immediately stop but rather remains in a movable state. Therefore, the lure's appealing appearance to the target fish can be maintained and the hit rate is easily increased.

A weight portion that is movable with respect to the body, and a biasing member that elastically deforms as the weight portion moves and that biases the weight portion by elastic restoring deformation can be disposed inside the body, and the weight portion can move so as to elastically deform the biasing member at least at the time of casting.

In this embodiment, by casting the lure and thus giving flight to the body, the weight portion disposed inside the body moves inside the body while elastically deforming the biasing member by inertia. Further, as the speed of the body decreases during the latter half of flight, the weight portion can move and be restored to its original position by the elastic restoring force of the biasing member.

In this manner, since the weight portion can be appropriately moved in accordance with the acceleration, speed, etc., that act on the body at the time of casting, the position of the center of gravity of the entire lure can be appropriately changed. As a result, the attitude of the body during flight can be maintained optimally in accordance with flight conditions, and the flight distance can thus be extended. Therefore, even with light casts, the lure can be efficiently flown over a long distance, which makes the lure easy to use.

By the lure according to embodiments of the present invention, even if an external force is transmitted to the wire that includes an eye due to a strike, or the like, it is possible to relax and disperse the external force transmitted from the wire to the body, thereby suppressing the transmission of the external force to the body.

DETAILED DESCRIPTION OF EMBODIMENTS

First Embodiment

A first embodiment of a lure according to the present invention is described below with reference to the figures.

In the present embodiment, a pencil bait lure, which is a salt lure for sea fishing that imitates the shape of a small fish, such as a sardine, and that is used as a topwater lure, etc., will be described as an example of the lure.

Figure 1:
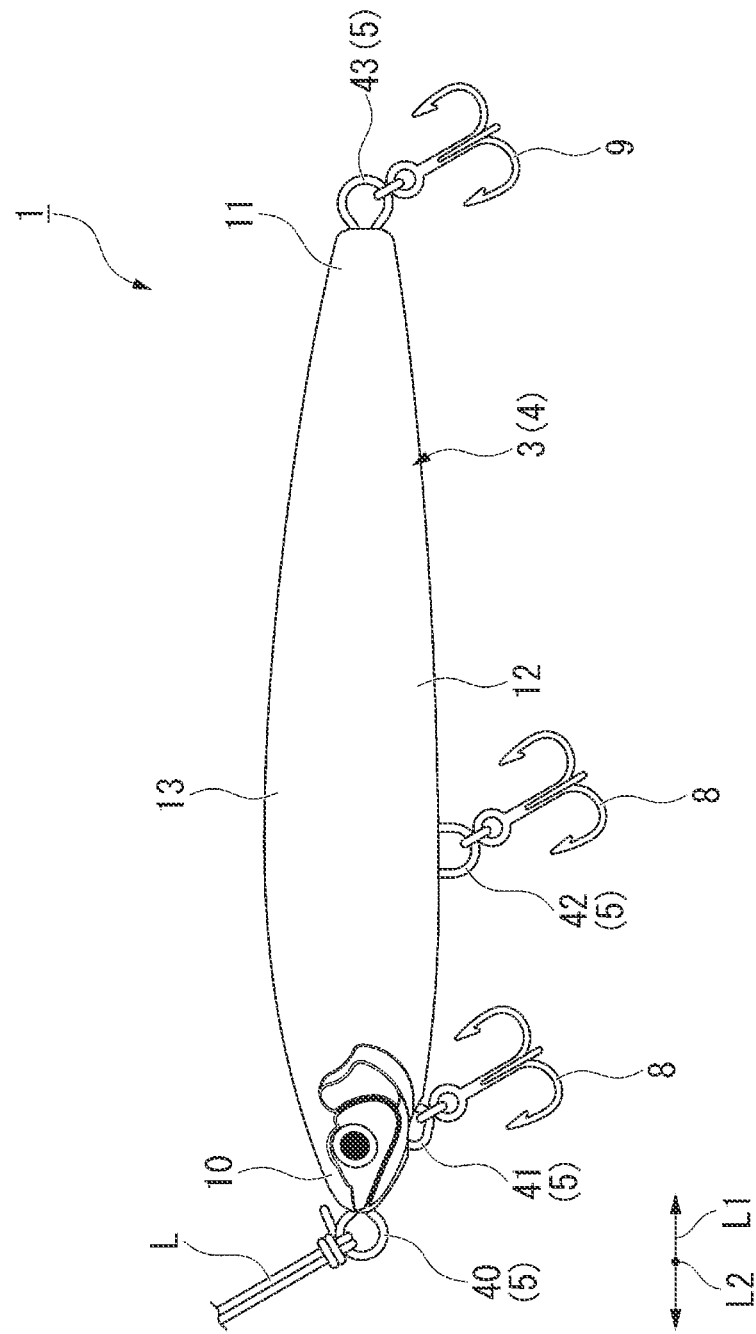
FIG. 1 is an external view of a lure, showing a first embodiment of the present invention.

As shown in FIGS. 1 to 4, a lure (lure for fishing) 1 of the present embodiment includes a body 4 configured by combining a first body 2 and a second body 3, a wire 6 that has a plurality of eyes 5 and that is combined with the body 4, and a buffer member 7 disposed between the body 4 and the wire 6. In each figure except FIG. 1, illustrations of a line L, front hook 8, and rear hook 9, described further below, are omitted.

The body 4 has an external shape that imitates the shape of a small fish and is connected to line (fishing line) L that is cast from a fishing rod, not shown. In the present embodiment, the direction along the longitudinal direction of the body 4 is defined as front-rear direction L1, and the direction orthogonal to front-rear direction L1 and the vertical direction is defined as left-right direction (lateral direction of the body) L2. Further, the direction from the body 4 toward line L along front-rear direction L1 is referred to as the front, and the opposite direction is referred to as the rear.

Body

Figure 2:
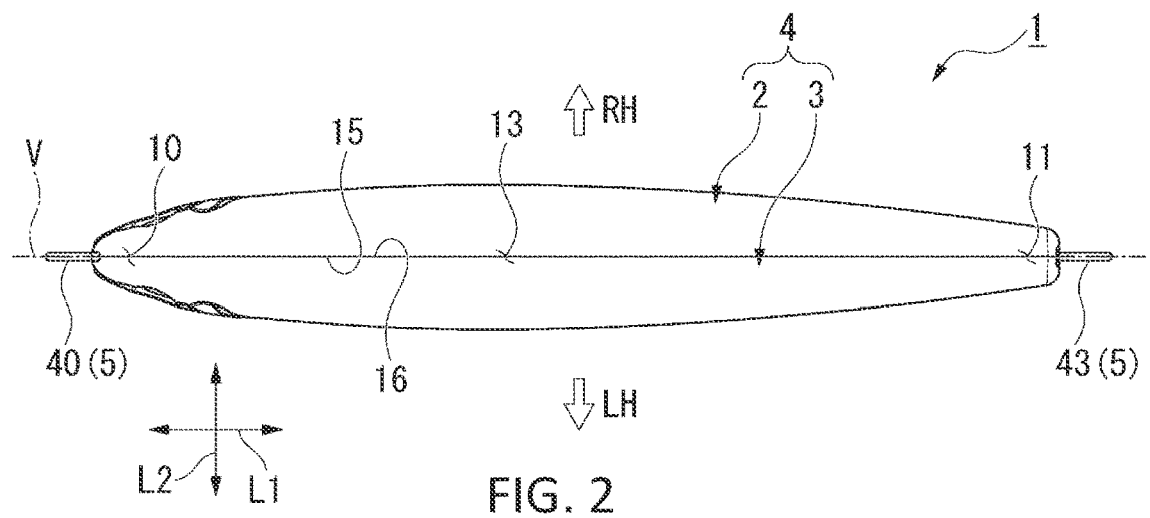
FIG. 2 is a top view of the lure shown in FIG. 1.
Figure 3:
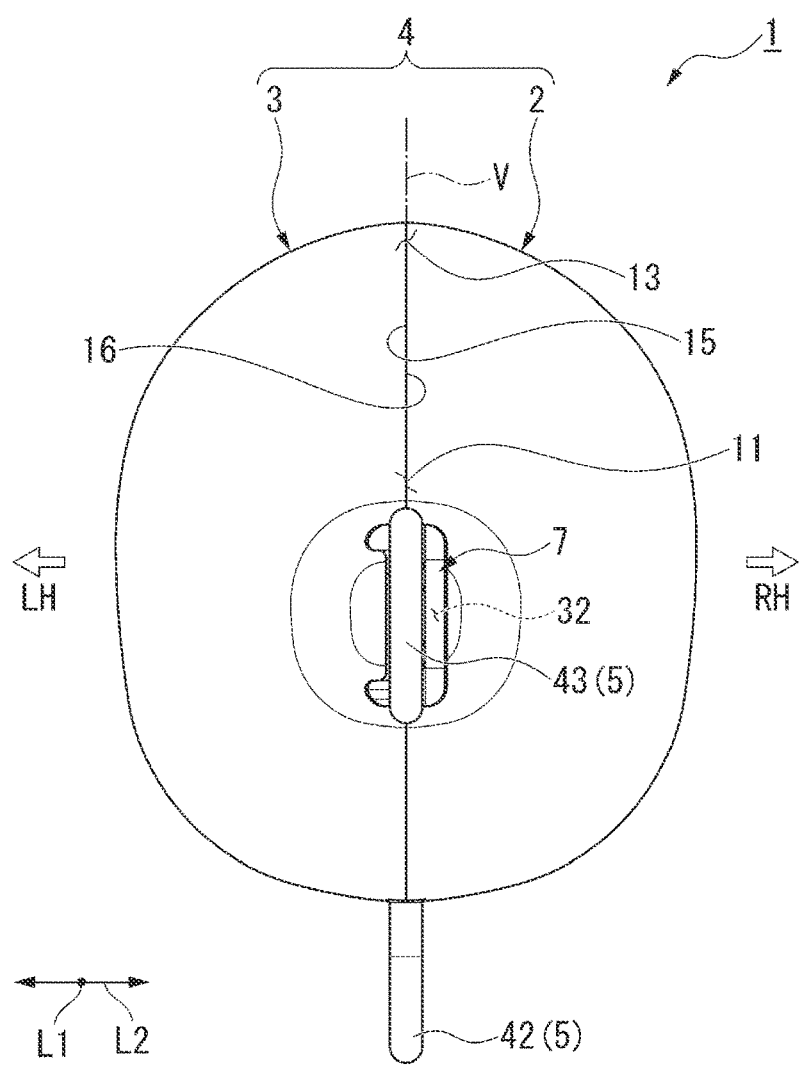
FIG. 3 is a rear view of the lure shown in FIG. 1, as viewed from the tail portion side.

As shown in FIGS. 1 to 3, the body 4 has an external shape imitating the shape of a small fish acting as bait, the front portion is defined as the head portion (head portion according to the present invention) 10, and the rear portion is defined as the tail portion (tail portion according to the present invention) 11. The lower portion of the body 4 located between the head portion 10 and the tail portion 11 is defined as an abdominal portion (pelvic fin portion) 12, and the upper portion is defined as a back portion (dorsal fin portion) 13.

The material of the body 4 is not specifically limited, but, for example, a synthetic resin material such as an ABS resin, etc., a metal material, or a material with high buoyancy, such as a hard foam, etc., can be employed. Further, the body 4 need not be formed from a so-called hard material, but can be formed from a so-called soft material, such as an elastomer. Further, various coatings and surface treatments, etc., can be applied to the outer surface of the body 4, as needed.

The body 4 of the present embodiment is formed by combining the first body 2 and the second body 3 from left-right direction L2.

The first body 2 and the second body 3 are formed such that their external shapes are bilaterally symmetrical. As shown in FIGS. 2 and 3, the first body 2 and the second body 3 are integrally combined, with a virtual plane (virtual vertical plane) V, which passes through the center of the body 4 in left-right direction L2 and which is parallel to front-rear direction L1 and the vertical direction, serving as the boundary surface. That is, the first body 2 and the second body 3 are integrally connected at the virtual surface V as a so-called mating surface.

In the present embodiment, if the left-hand and right-hand sides are defined from the viewpoint of the body 4 as seen from the rear, the divided body located on the right-hand side (RH) is defined as the first body 2, and the other divided body located on the left-hand side (LH) is defined as the second body 3.

Figure 4:
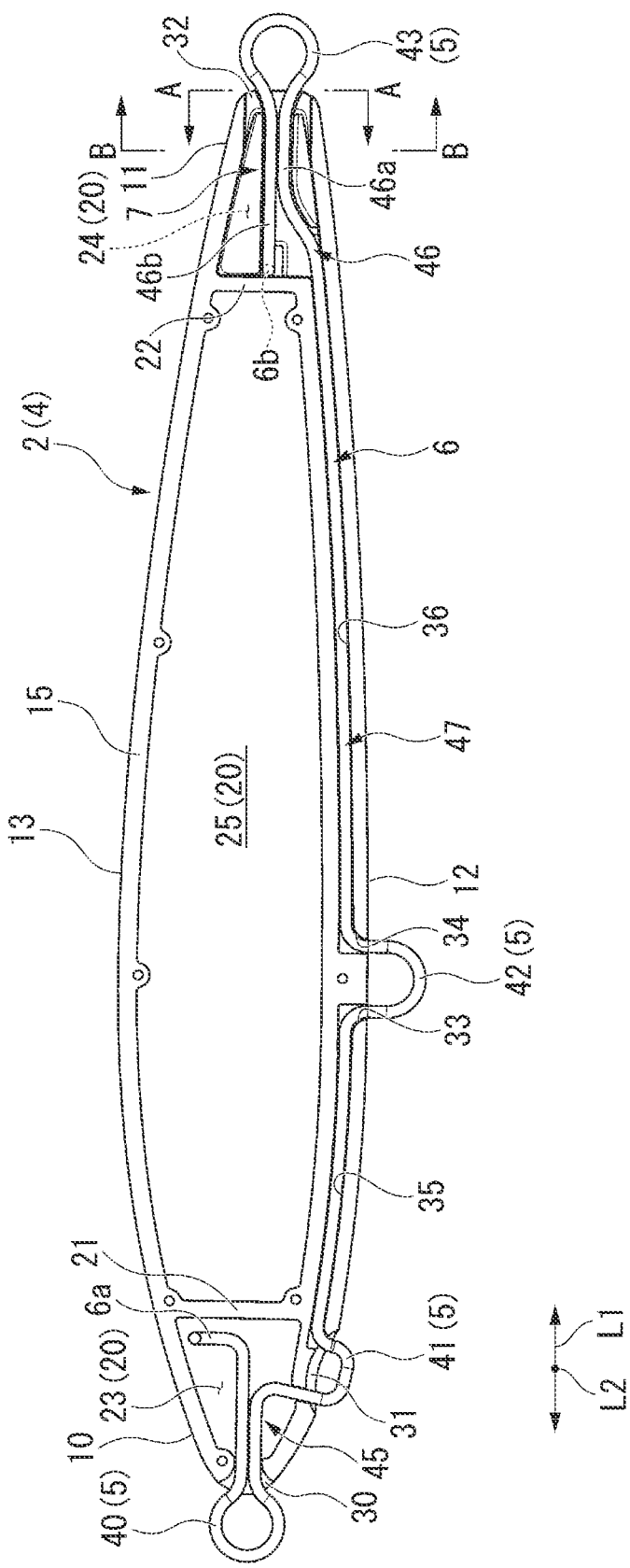
FIG. 4 is a side view of a first body constituting the body of the lure shown in FIG. 1, as viewed from the first bonding surface side.

As shown in FIGS. 2-4, the first body 2 has a first bonding surface 15 that faces the left-hand side (LH), which is along the virtual surface V and that is the second body 3 side, and that is formed along the outer shape of the first body 2. Similarly, the second body 3 has a second bonding surface 16 that faces the right-hand side (RH), which is along the virtual surface V and that is the first body 2 side, and that is formed along the outer shape of the second body 3.

The first body 2 and the second body 3 are integrally combined in a state in which the first bonding surface 15 and the second bonding surface 16 are opposed.

The first body 2 will be described in detail.

As shown in FIG. 4, in the first body 2, the first bonding surface 15 follows the external shape of the first body 2, as described above. That is, the first bonding surface 15 follows the head portion 10, the abdominal portion 12, the tail portion 11, and the back portion 13 of the first body 2 continuously. Thus, in a side view, i.e., a view of the first body 2 from the left-hand side (LH), a hollow chamber 20 can be seen that is surrounded by the first bonding surface 15 formed on the inner side of the first body 2.

In the illustrated example, the hollow chamber 20 is divided into three sections in front-rear direction L1 by a first rib 21 located on the head portion 10 side and a second rib 22 located on the tail portion 11 side. The first rib 21 and the second rib 22 are formed to be long orthogonally, extending in the vertical direction, and the upper and lower end portions thereof are formed so as to be integrally connected to the first bonding surface 15.

Of the hollow chambers 20, the hollow chamber 20 located in front of the first rib 21 is defined as front hollow chamber 23, the hollow chamber 20 located behind the second rib 22 is defined as rear hollow chamber 24, and the hollow chamber 20 located between the first rib 21 and the second rib 22 is defined as central hollow chamber 25. In the illustrated example, the central hollow chamber 25 is formed to have a larger internal volume than that of the front hollow chamber 23 and the rear hollow chamber 24.

In the present embodiment, the first rib 21 and the second rib 22 divide the hollow chamber 20 into three sections is described as an example, but the number of ribs is not limited to two, and one or three or more can be formed. As a result, the hollow chamber 20 can be divided into two sections, or into four or more sections, for example. However, the first rib 21 and the second rib 22 are not essential and need not be provided.

Since the second body 3 is formed in the same manner as the first body 2, a detailed description thereof is omitted.

As shown in FIGS. 1 to 3, the first body 2 and the second body 3 are integrally combined in a state in which the first bonding surface 15 and the second bonding surface 16 are opposed, as described above, to thereby form the body 4. When the first body 2 and the second body 3 are combined, various joining methods can be employed, such as a pin bonding method using a plurality of pins, adhesive fixing using an adhesive, etc. Further, the interior of the body 4 has a hollow structure that contains the front hollow chamber 23, the rear hollow chamber 24, and the central hollow chamber 25.

Further, as shown in FIG. 4, the body 4 of the present embodiment is formed with a plurality of external communication holes to expose each of a plurality of eyes 5 which are formed on the wire 6 to the outside.

Specifically, a front communication hole 30 that penetrates the body 4 in the front-rear direction L1 is formed in the head portion 10 of the body 4. The front communication hole 30 is located in the frontmost portion of the body 4 and passes through the first bonding surface 15 and the second bonding surface 16 in the front-rear direction L1, so that the interior of the front hollow chamber 23 communicates with the outside.

Further, a jaw portion communication hole 31 that penetrates the body 4 in the vertical direction is formed in a portion of the body 4 that corresponds to the imitated jaw portion of a small fish. The jaw portion communication hole 31 is located between the front communication hole 30 and the first rib 21 and passes through the first bonding surface 15 and the second bonding surface 16 in the vertical direction, so that the interior of the front hollow chamber 23 communicates with the outside.

Further, a rear communication hole (external communication hole according to the present invention) 32 that penetrates the body 4 in front-rear direction L1 is formed in the tail portion 11 of the body 4. The rear communication hole 32 is located in the rearmost portion of the body 4 and passes through the first bonding surface 15 and the second bonding surface 16 in front-rear direction L1, so that the interior of the rear hollow chamber 24 communicates with the outside.

Further, a first abdominal portion communication hole 33 and a second abdominal portion communication hole 34 that open downward are formed in the abdominal portion 12 of the body 4, separated in front-rear direction L1. The first abdominal portion communication hole 33 and the second abdominal portion communication hole 34 are formed to be respectively connected to the interior of a first wire groove 35 and of a second wire groove 36 formed in portions of the first bonding surface 15 and the second bonding surface 16 located in the abdominal portion 12.

The first wire groove 35 and the second wire groove 36 are storage grooves for receiving the wire 6, and are formed in portions of the first bonding surface 15 and the second bonding surface 16 located in the abdominal portion 12.

Specifically, the first wire groove 35 is disposed in a portion of the first bonding surface 15 and the second bonding surface 16, which is located between the jaw portion communication hole 31 and the first abdominal portion communication hole 33, and is formed along the abdominal portion 12 so as to communicate with the interior of the jaw portion communication hole 31 and the interior of the first abdominal portion communication hole 33. The second wire groove 36 is disposed in a portion of the first bonding surface 15 and the second bonding surface 16, which is located between the second abdominal portion communication hole 34 and the rear hollow chamber 24, and is formed along the abdominal portion 12 so as to communicate with the interior of the second abdominal portion communication hole 34 and the interior of the rear hollow chamber 24.

Wire

The wire 6 is formed by the bending of a metal wire that has rustproof properties, such as stainless steel, and that has a plurality of eyes 5 to which line L or a hook can be connected. The plurality of eyes 5 are formed by portions of the wire 6 that have circular or semicircular shapes. In particular, the wire 6 according to the present embodiment is formed by bending one long metal wire extending in front-rear direction L1 so as to have four eyes 5.

The wire 6 is combined with the body 4 by accommodating a portion thereof in the first wire groove 35 and the second wire groove 36, in a state in which the four eyes 5 are exposed to the outside of the body 4. As a result, the wire 6 is sandwiched between the first body 2 and the second body 3 in a state in which the wire is disposed from the head portion 10 to the tail portion 11 via the abdominal portion 12.

As shown in FIGS. 1 and 4, of the plurality of eyes 5, the eye 5 that is exposed to the front side of the body 4 through the front communication hole 30 functions as a line eye 40 to which line L from the fishing rod is connected. In the illustrated example, an embodiment in which line L is directly connected to the line eye 40 is illustrated, but line L can be connected to the line eye 40 using a connecting metal fitting, such as a swivel.

Of the plurality of eyes 5, the eye 5 that is exposed to the abdominal portion 12 side of the body 4 through the jaw portion communication hole 31 functions as a front hook eye 41, to which the front hook 8 is connected. Similarly, of the plurality of eyes 5, the eye 5 that is exposed to the abdominal portion 12 side of the body 4 through the first abdominal portion communication hole 33 and the second abdominal portion communication hole 34 functions as a front hook eye 42, to which the front hook 8 is connected.

Further, of the plurality of eyes 5, the eye 5 that is exposed to the rear side of the body 4 through the rear communication hole 32 functions as a rear hook eye 43, to which the rear hook 9 is connected.

As shown in FIG. 4, of the end portions of the wire 6, a first end portion 6a located in the front is accommodated in the front hollow chamber 23 and is locked to a locking portion, not shown. Of the end portions of the wire 6, a second end portion 6b located in the rear is accommodated in the rear hollow chamber 24 and is locked to a locking portion, not shown.

In this manner, the wire 6 is sandwiched between the first body 2 and the second body 3 in a state in which a wire front portion 45 that includes the first end portion 6a is disposed inside the front hollow chamber 23, a wire rear portion 46 that includes the second end portion 6b is disposed inside the rear hollow chamber 24, and a wire center portion 47 is accommodated in the first wire groove 35 and the second wire groove 36.

The wire rear portion 46 that is disposed inside the rear hollow chamber 24 will now be described in detail.

Figure 5:
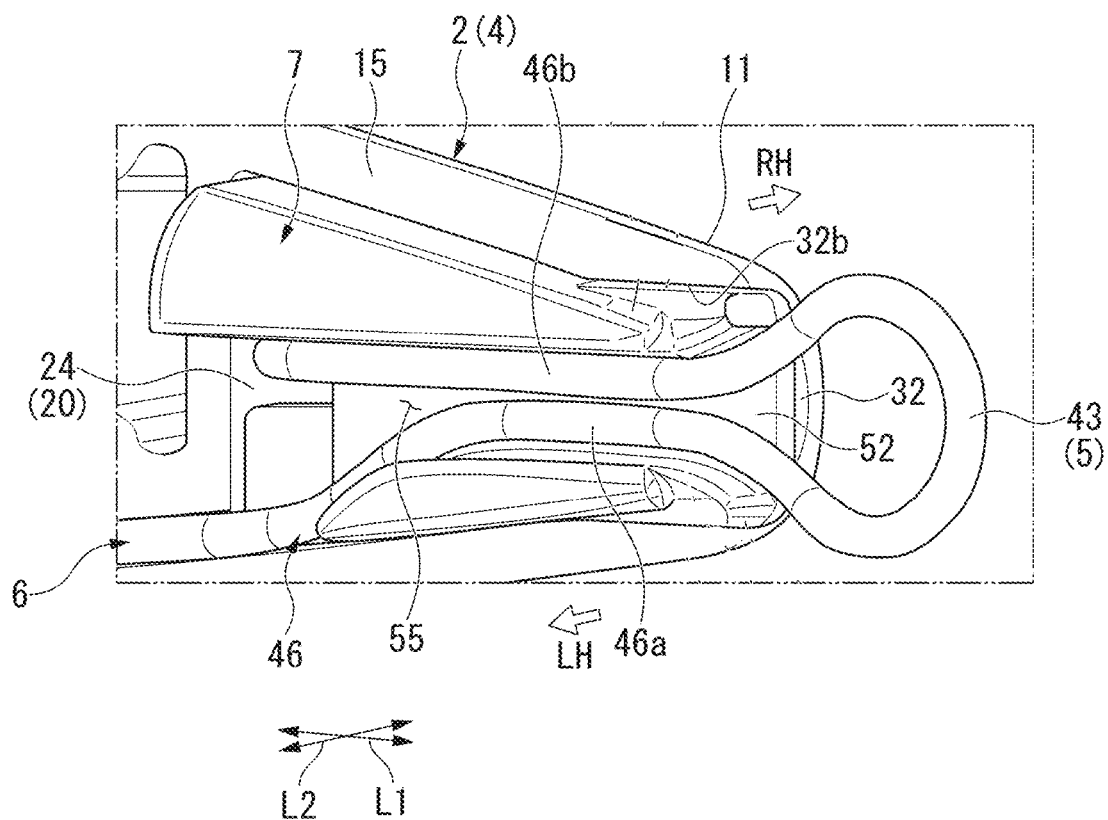
FIG. 5 is an enlarged perspective view of the periphery of a buffer member shown in FIG. 4.

As shown in FIGS. 4 and 5, the wire rear portion 46 extends along the interior of the second wire groove 36 into the interior of the rear hollow chamber 24, then to project from the rear communication hole 32 rearward of the body 4, then bend into a circular shape and pass again through the rear communication hole 32 and re-enter the rear hollow chamber 24.

Of the wire rear portion 46 formed in this manner, the portion that extends from the interior of the second wire groove 36 through the interior of the rear hollow chamber 24, and then rearward of the body 4 through the rear communication hole 32 is referred to as first wire strand portion 46a. Further, the portion formed into a circular shape at the rear of the body 4 functions as the rear hook eye 43 described above. Thus, the rear hook eye 43 is formed so as to be continuously connected to the first wire strand portion 46a. Further, the portion that is formed so as to be continuously connected to the rear hook eye 43 and enter the rear hollow chamber 24 through the rear communication hole 32 is referred to as second wire strand portion 46b.

In the rear hollow chamber 24, the first wire strand portion 46a and the second wire strand portion 46b are arranged spaced apart in the vertical direction and extend in front-rear direction L1. The end portion of the second wire strand portion 46b corresponds to the second end portion 6b described above.

Buffer Member

As shown in FIGS. 4 and 5, the buffer member 7 is disposed within the rear hollow chamber 24 and is located at the wire rear portion 46 and the body 4.

As shown in FIGS. 4 to 7, the buffer member 7 is formed to have a C-shape in a vertical cross-sectional view, including a first buffer portion 50 and a second buffer portion 51 arranged to face each other in the vertical direction across the first wire strand portion 46a and the second wire strand portion 46b, and a connecting portion 52 that connects the first buffer portion 50 and the second buffer portion 51, and is disposed within the rear hollow chamber 24 to contact both the first body 2 and the second body 3.

The first buffer portion 50 is disposed below the first wire strand portion 46a and extends in the front-rear direction L1 along the lower surface of the rear hollow chamber 24. As a result, the first buffer portion 50 is disposed between the lower surface of the rear hollow chamber 24 and the first wire strand portion 46a over the entire length of the first wire strand portion 46a. Therefore, the first buffer portion 50 prevents the first wire strand portion 46a directly contacting the lower surface of the rear hollow chamber 24.

The first buffer portion 50 is in contact with or in close proximity to the lower surface of the rear hollow chamber 24. Specifically, the lower surface of the rear communication hole 32 is a first contacted surface 32a that faces the first buffer portion 50. The first contacted surface 32a is formed on the first body 2 and the second body 3 in the shape of a flat surface extending in left-right direction L2 with the first bonding surface 15 and the second bonding surface 16 therebetween. The first contacted surface 32a constitutes a part of the lower surface of the rear hollow chamber 24.

In contrast, the portion of the first buffer portion 50 opposing the first contacted surface 32a is a first contact surface 50a that comes into contact with the first contacted surface 32a. In the illustrated example, the first contact surface 50a is in surface contact with the first contacted surface 32a from above.

The second buffer portion 51 is disposed above the second wire strand portion 46b and is formed extending in front-rear direction L1 along the upper surface of the rear hollow chamber 24. As a result, the second buffer portion 51 is disposed between the upper surface of the rear hollow chamber 24 and the second wire strand portion 46b over the entire length of the second wire strand portion 46b. Therefore, the second buffer portion 51 prevents the second wire strand portion 46b from directly contacting the upper surface of the rear hollow chamber 24.

The second buffer portion 51 is in contact with or in close proximity to the upper surface of the rear hollow chamber 24. Specifically, the upper surface of the rear communication hole 32 is a second contacted surface 32b that faces the second buffer portion 51. The second contacted surface 32b is formed on the first body 2 and the second body 3 and is formed in the shape of a flat surface extending in left-right direction L2 with the first bonding surface 15 and the second bonding surface 16 therebetween. The second contacted surface 32b constitutes a part of the upper surface of the rear hollow chamber 24.

In contrast, the portion of the second buffer portion 51 opposing the second contacted surface 32b is a second contact surface 51a contacts the second contacted surface 32b. In the illustrated example, the second contact surface 51a is in surface contact with the second contacted surface 32b from above.

The connecting portion 52 is disposed on the right-hand side (RH) of the first wire strand portion 46a and the second wire strand portion 46b and is in the form of a wall connecting the right end portion of the first buffer portion 50 and the right end portion of the second buffer portion 51 in the vertical direction. The connecting portion 52 extends in the front-rear direction L1 so as to connect the right end portion of the first buffer portion 50 and the right end portion of the second buffer portion 51 to each other over the entire length thereof.

As a result, the entire buffer member 7 has a C-shape that opens on the left-hand side (LH), as seen in a vertical cross-sectional view. The connecting portion 52 is in contact with or in close proximity to the side surface of the rear hollow chamber 24 formed on the first body 2 side.

The buffer member 7, configured as described above is fixed to the body 4 in a state in which the buffer member is disposed in the rear hollow chamber 24. Specifically, the buffer member 7 is fixed to the body 4 by adhesion, fusion, or the like, in a state in which at least the first contact surface 50a in contact with the first contacted surface 32a and the second contact surface 51a in contact with the second contacted surface 32b.

The material of the above-described buffer member 7 is not particularly limited, but a material softer than that of the body 4 (first body 2 and the second body 3) is preferable, such as a synthetic resin material (polyethylene, polypropylene, etc.), or a rubber material. Here, the material of the buffer member 7 can be selected in consideration of corrosion resistance, water resistance, wear resistance, etc. When the buffer member 7 is made of synthetic resin, reinforcing fibers such as carbon fibers can be included in the synthetic resin material.

Since the buffer member 7, configured as described above, is disposed in the rear hollow chamber 24 of the body 4, the wire rear portion 46 is sandwiched between the first body 2 and the second body 3 via the buffer member 7.

Specifically, as shown in FIG. 5, the wire rear portion 46 is pushed into the inside of the buffer member 7 through an opening formed in the left-hand side (LH), and is thus disposed inside an accommodation space 55 surrounded by the first buffer portion 50, the second buffer portion 51, and the connecting portion 52, in a state in which the rear hook eye 43 is exposed toward the rear from the body 4. As a result, the wire rear portion 46 is surrounded by the first buffer portion 50, the second buffer portion 51, and the connecting portion 52, and sandwiched between the first body 2 and the second body 3 via the buffer member 7.

Figure 6:
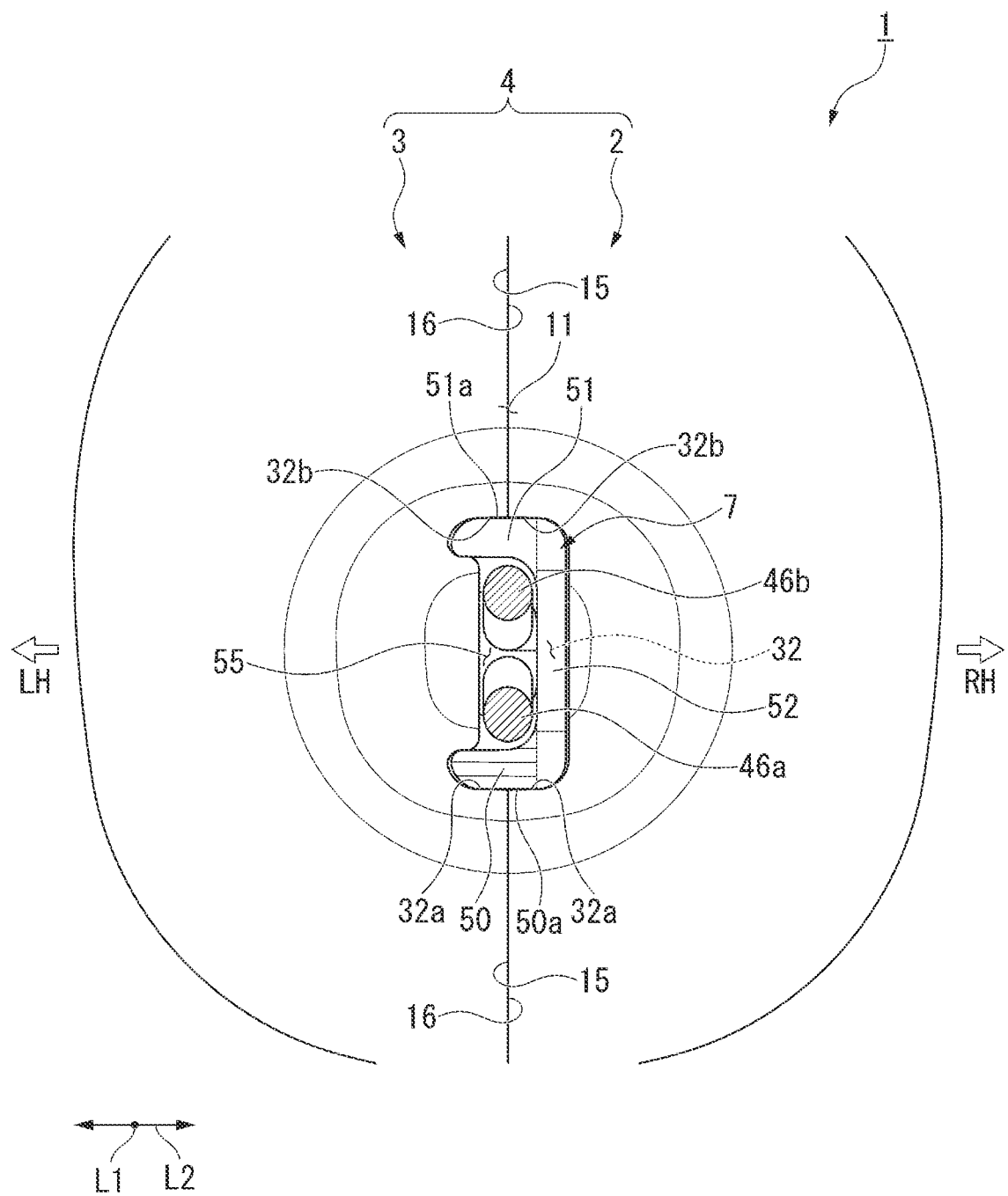
FIG. 6 shows a longitudinal cross section through line A-A in FIG. 5.
Figure 7:
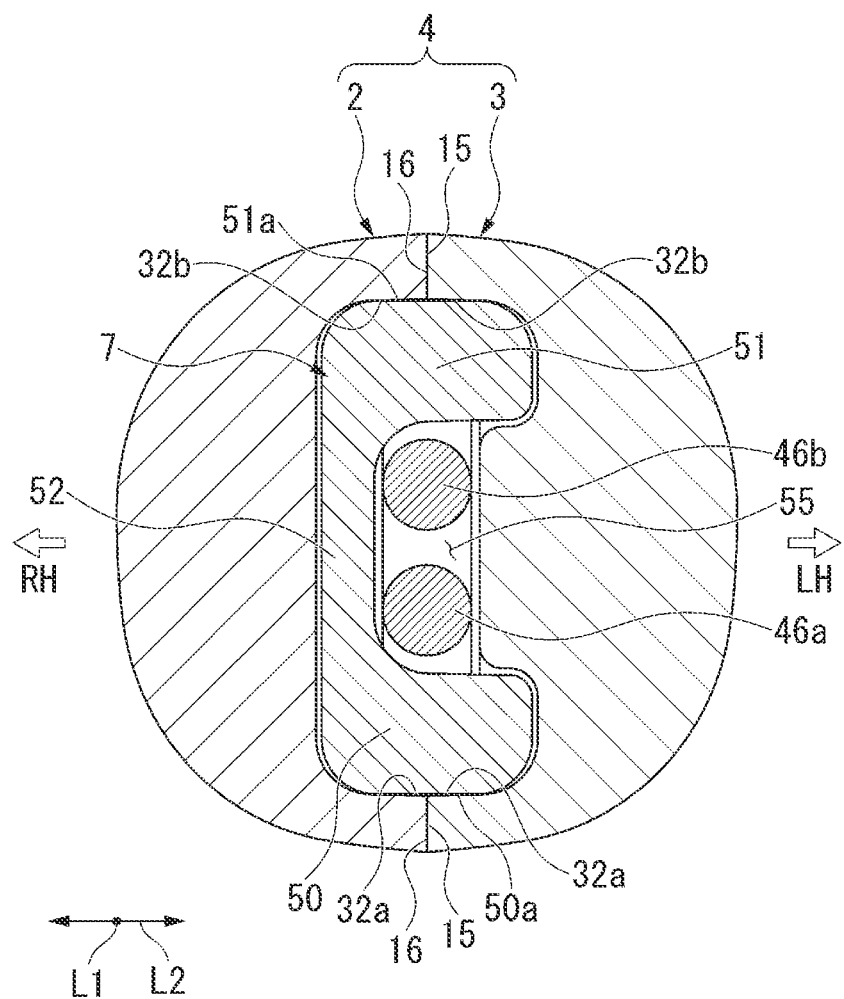
FIG. 7 shows a longitudinal cross section through line B-B in FIG. 5.

Specifically, as shown in FIGS. 6 and 7, the first wire strand portion 46a and the second wire strand portion 46b are sandwiched between the first buffer portion 50 and the second buffer portion 51 in the vertical direction. Therefore, the first wire strand portion 46a is prevented by the first buffer portion 50 from directly pressing against the boundary surface between the first bonding surface 15 and the second bonding surface 16 from above. Similarly, the second wire strand portion 46b is prevented by the second buffer portion 51 from directly pressing against the boundary surface between the first bonding surface 15 and the second bonding surface 16 from below.

The wire rear portion 46 is accommodated on the inside of the buffer member 7 so as to be movable relative to the buffer member 7. As a result, the wire rear portion 46 is incorporated inside of the buffer member 7 in a state to allow play (freedom of movement) with respect to the buffer member 7.

Action of the Lure

Next, the case in which fishing is performed using the lure 1 with the above-described configuration will be described. In this case, casting is carried out, and as shown in FIG. 1, the lure 1 is placed in the water (in the sea, etc.), together with the line L. Movement (action) can then be added to the lure 1 via the line L in order to swing the lure 1 in the water or on the surface of the water, for example, to attract the target fish. As a result, it is possible to induce the target fish to bite the lure 1, and thus hook the target fish on the front hook 8 and/or the rear hook 9.

Here, if the target fish is hooked on the rear hook 9, a large external force is transmitted from the target fish to the rear hook eye 43, so that the wire 6 moves relative to the buffer member 7 and the body 4. Even in such a case, as shown in FIGS. 5 to 7, since the wire rear portion 46 that includes the rear hook eye 43 is sandwiched between the first body 2 and the second body 3 via the buffer member 7, it is possible to prevent the wire rear portion 46 from directly pressing against the body 4.

Therefore, it is possible to suppress the occurrence of inconveniences, such as the wire rear portion 46 strongly pressing against the body 4 and thus splitting the body 4, tearing the first bonding surface 15 and the second bonding surface 16 apart, as in the prior art. That is, it is possible to relax and disperse the external force (external force from the target fish) that is transmitted from the wire rear portion 46 to the body 4 by the buffer member 7.

Therefore, since the external force can be prevented from becoming concentrated and being transmitted between the first bonding surface 15 and the second bonding surface 16, the generation of cracks in the body 4 that can separate the first body 2 and the second body 3 are less likely to occur. Therefore, a long-term stable quality lure 1 can be obtained.

Thus, by the lure 1 of the present embodiment, even if an external force is transmitted to the wire rear portion 46 via the rear hook eye 43 due to a strike by a target fish, the external force transmitted from the wire rear portion 46 to the body 4 can be relaxed and dispersed by the buffer member 7. Therefore, the generation of cracks, etc., in the body 4 that would separate the first body 2 and the second body 3 can be prevented.

Since, the wire rear portion 46 can move relative to the buffer member 7, and the freedom of movement of the wire 6 that includes the rear hook eye 43 is secured, the wire rear portion 46 can be displaced in accordance with the movement of the target fish that has bitten the rear hook 9. Therefore, a lure 1 with which the target fish does not easily become detached from the hook can be obtained.

Specifically, in the present embodiment, as shown in FIGS. 5 to 7, the first buffer portion 50 and the second buffer portion 51 of the buffer member 7 face each other in the vertical direction, sandwiching the first wire strand portion 46a and the second wire strand portion 46b therebetween. Therefore, even if the wire rear portion 46 moves in the vertical direction with respect to the buffer member 7 due to an external force from the target fish, it is possible to bring the wire rear portion 46 in contact with the first buffer portion 50 and the second buffer portion 51. Therefore, it is possible to use the first buffer portion 50 and the second buffer portion 51 to prevent the wire rear portion 46 from directly pressing against the boundary portion between the first bonding surface 15 and the second bonding surface 16.

Moreover, since the wire rear portion 46 is disposed in the accommodation space 55 surrounded by the first buffer portion 50, the second buffer portion 51, and the connecting portion 52, even if the wire rear portion 46 moves, for example, in the left-right direction L2 relative to the buffer member 7 due to an external force from the target fish, it will be difficult for the wire rear portion 46 to press directly against the body 4.

Further, the buffer member 7 is disposed on the inner side of the rear communication hole 32, in a state in which the first contact surface 50a of the first buffer portion 50 is in contact with the first contacted surface 32a, and the second contact surface 51a of the second buffer portion 51 is in contact with the second contacted surface 32b. As a result, the buffer member 7 can be appropriately combined with the body 4 without causing a displacement, for example, so that problems such as the buffer member 7 turning with respect to the body 4 do not easily occur.

Therefore, it is possible to dispose the buffer member 7 between the body 4 and the wire rear portion 46 of the wire 6 in a state in which the orientation of the buffer member 7 is stabilized. As a result, the buffer member 7 can aptly take on the function, for example, of preventing the wire rear portion 46 from directly pressing against the body 4.

Moreover, since the buffer member 7 is fixed to the body 4 (first body 2 and the second body 3), it is possible to prevent such inconveniences as the buffer member 7 unintentionally sliding or turning with respect to the body 4, and thus changing the orientation of the buffer member 7, or the buffer member 7 falling off the body 4.

Second Embodiment

A second embodiment of a lure according to the present invention is described below with reference to the figures. In this second embodiment, the portions that are the same as compositional elements of the first embodiment have been assigned the same reference symbols, and their descriptions have been omitted.

In the second embodiment, a center of gravity shifting mechanism and a reflection mechanism are built into the central hollow chamber 25 of the first embodiment.

Figure 8:
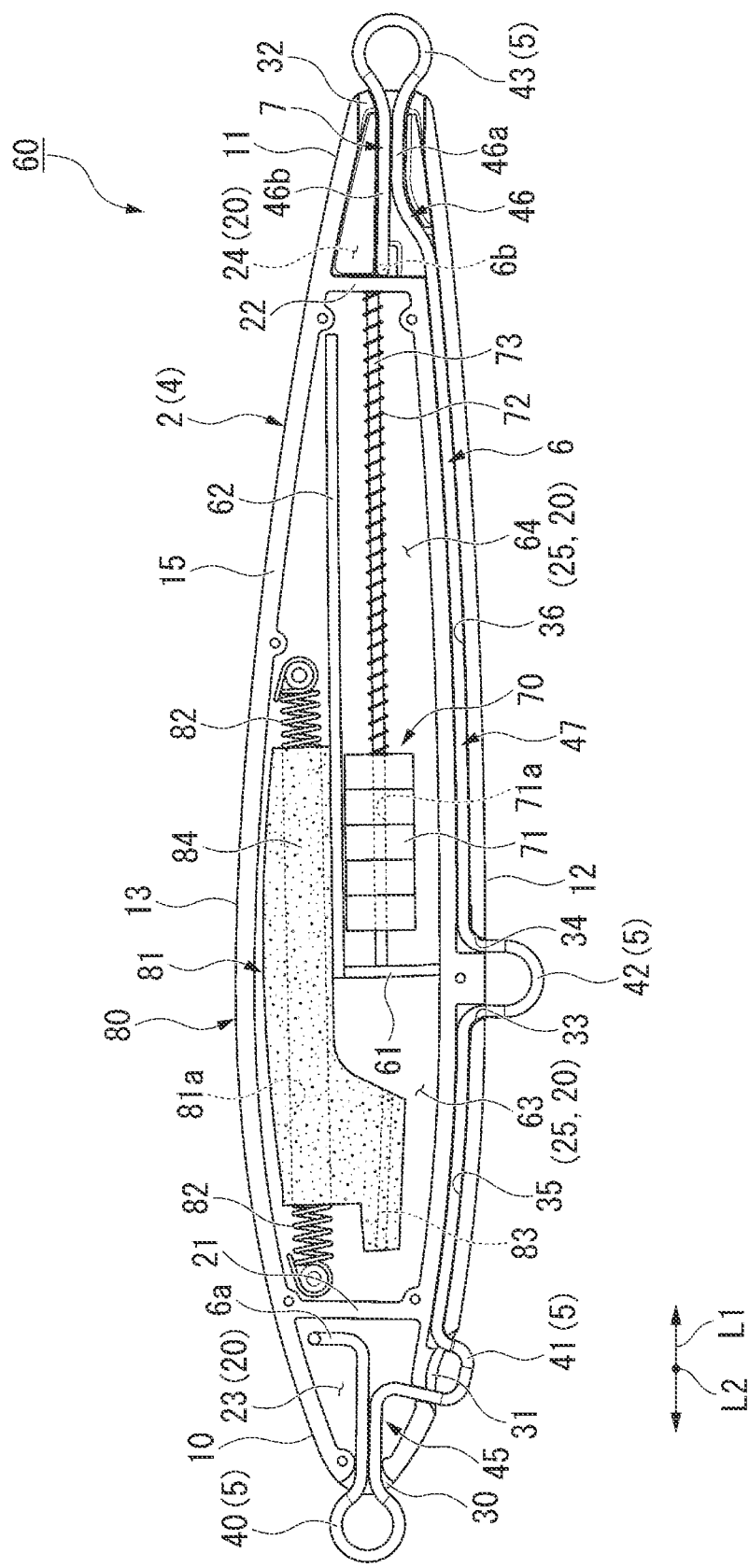
FIG. 8 is a side view of the first body constituting the lure, as viewed from the first bonding surface side, showing a second embodiment of the present invention.

As shown in FIG. 8, a lure 60 of the present embodiment includes a center of gravity shifting mechanism 70 and a reflection mechanism 80 that are disposed inside the body 4. The center of gravity shifting mechanism 70 and the reflection mechanism 80 are disposed inside the central hollow chamber 25.

Specifically, a vertically long first partition rib 61 that is located between the first rib 21 and the second rib 22, formed to extend in the vertical direction, and that partitions the inside of the central hollow chamber 25 in the front-rear direction, and a laterally long second partition rib 62 that extends from the upper end portion of the first partition rib 61 rearward and that partitions the inside of the central hollow chamber 25 vertically, are disposed inside the central hollow chamber 25.

As a result, the inside of the central hollow chamber 25 is partitioned into a first central hollow chamber 63 located on the head portion 10 side and the back portion 13 side of the body 4, and a second central hollow chamber 64 located on the tail portion 11 side and the abdominal portion 12 side of the body 4. The center of gravity shifting mechanism 70 is disposed inside the second central hollow chamber 64 and the reflection mechanism 80 is disposed inside the first central hollow chamber 63.

Center of Gravity Shifting Mechanism

The center of gravity shifting mechanism 70 has a weight portion 71 that is movable relative to the body 4 in front-rear direction L1, a coil spring (biasing member according to the present invention) 72 that deforms elastically as the weight portion 71 moves and biases the weight portion 71 by elastic restoring deformation, and a guide rod 73, which is a guide member that guides the movement of the weight portion 71.

The guide rod 73 extends along the front-rear direction L1 and is disposed between the first partition rib 61 and the second rib 22. The guide rod 73 is formed from a metal wire, for example. The material of the metal wire is not particularly limited, and examples thereof include steel, stainless steel, copper alloy, titanium alloy, and the like. Various surface treatments can be applied to the outer surface of the guide rod 73 to achieve a reduction of the friction force, etc., between the guide rod 73 and the weight portion 71.

The weight portion 71 is formed in a columnar shape that is long in the front-rear direction L1, for example, and an insertion hole 71a into which the guide rod 73 is inserted is formed along the central axis thereof. The weight portion 71 is thereby guided along the guide rod 73 so as to be movable in front-rear direction L1.

The shape of the weight portion 71 is not limited to the columnar shape, but can be prismatic, spherical, etc., as deemed appropriate. Further, the material of the weight portion 71 is not particularly limited, and examples thereof include lead, lead alloy, brass, tungsten, tungsten alloy, steel, and stainless steel. As this time, a material is preferably selected such that the specific gravity of the weight portion 71 is greater than the specific gravity of the body 4.

The coil spring 72 is mounted on the guide rod 73 so as to be disposed between the weight portion 71 and the second rib 22. As a result, normally, the weight portion 71 is positioned on the front side (head portion 10 side of the body 4) by the coil spring 72. The coil spring 72 can be disposed in the compressed state or the relaxed state.

In the center of gravity shifting mechanism 70 configured as described above, the weight portion 71 moves rearward (tail portion 11 side of the body 4) due to inertia at least at the time of casting the lure 60, thereby changing the overall center of gravity of the lure 60. At this time, the weight portion 71 moves while elastically deforming (compressive deformation) the coil spring 72.

Reflection Mechanism

The reflection mechanism 80 includes a swinging part 81 that is disposed inside the first central hollow chamber 63 and is attached so as to be movable with respect to the body 4.

The swinging part 81 is attached to the body 4 via a coil spring 82 disposed within the first central hollow chamber 63. The swinging part 81 is formed in a plate shape extending along the front-rear direction L1. The upper end portion of the swinging part 81 is a bulging portion that bulges in the front-rear direction L1. The inner side of the bulging portion is a mounting hole 81a in which the coil spring 82 is incorporated and penetrates the swinging part 81 in the front-rear direction L1. The swinging part 81 is thereby disposed in the first central hollow chamber 63 in a state of suspension by the coil spring 82.

A weight 83 is built into the lower end portion of the swinging part 81. The swinging part 81 can thereby swing largely due to inertia of the weight 83, and the like. The weight 83 is not essential and need not be provided.

A reflective film (the reflector according to embodiments of the present invention) 84 that reflects light from the outside is formed on the outer surface of the swinging part 81. Any reflective film that reflects light can be used as the reflective film 84, such as glossy metallic reflective film, a fluorescent film comprising a fluorescent paint, or a hologram film that reflects light due to the prism effect. In the illustrated example, for the purpose of making the drawings more viewable, the reflective film 84 is represented by dot-shaped hatching. The reflective film 84 also can be formed by coloring or patterning.

Further, in the present embodiment, at least the portion (mainly the back portion 13 side) of the body 4 (first body 2 and the second body 3) surrounding the swinging part 81 on which the reflective film 84 is formed is sufficiently transparent to permit the passage of light (ultraviolet rays). Thus, light passing through the body 4 can be made incident on the reflective film 84, and the light reflected by the reflective film 84 can be emitted outside of the body 4.

Action of the Lure

Even the lure 60 of embodiments of the present embodiment, configured as described above, can realize the same action and effects as those of the first embodiment, and further realize the following action and effects.

Figure 9:
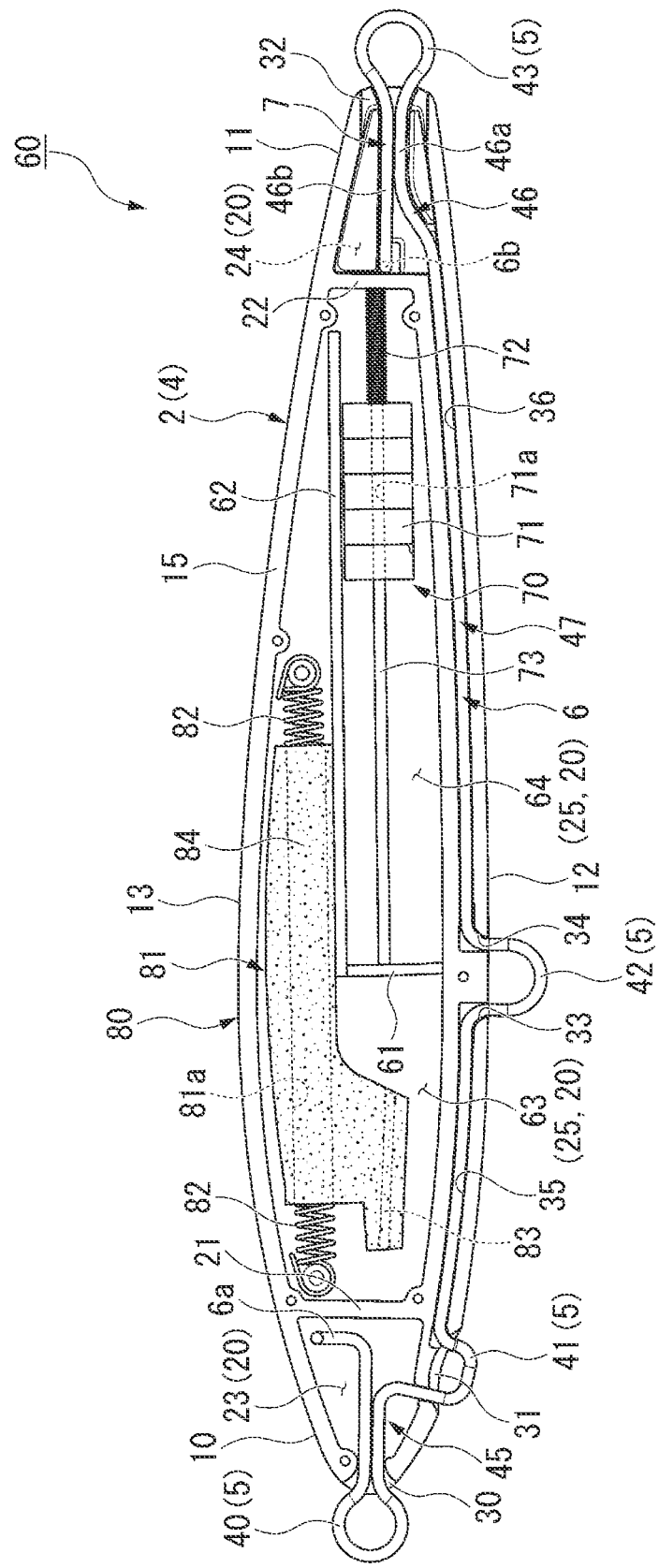
FIG. 9 is a diagram showing a state in which the weight portion shown in FIG. 8 has moved to the tail portion side of the body.

That is, when the lure 60 is cast and the body 4 is in flight, the tail portion 11 opposite to the head portion 10 connected to the line L, flies ahead. For this reason, as shown in FIG. 9, the weight portion 71 of the center of gravity shifting mechanism 70 moves to the tail portion 11 side due to inertia, elastically deforming the coil spring 72. Therefore, in the initial stage of flight, the center of gravity of the lure 60 as a whole can be moved (shifted) from the head portion 10 side to the tail portion 11 side by movement of the weight portion 71. As a result, it is possible to cause the lure 60 to fly forcefully, with the tail portion 11 side flying ahead in a state in which the attitude of the lure 60 is stabilized, thereby increasing the flight distance. Moreover, during casting, the movement of the weight portion 71 causes an efficient application of centrifugal force to the lure 60. This also contributes to an increase in the flight distance of the lure 60.

Further, during the latter half of the flight, the speed of the lure 60 decreases due to air resistance, etc., resulting in a negative acceleration acting on the lure. As a result, it is possible to utilize the elastic restoring force of the coil spring 72 to move the weight portion 71 to the head portion 10 side and restore the weight to its original position, as shown in FIG. 8. Thus, the position of the center of gravity of the lure 60 as a whole can be moved to the head portion 10 side, thereby maintaining an attitude of the lure 60 during flight in which the tail portion 11 side does not readily drop down. Therefore, the flight distance of the lure 60 can also be increased during the latter half of the flight.

In this manner, since the weight portion 71 can be appropriately moved in accordance with the acceleration, speed, etc., that act on the body 4 at the time of casting, the position of the center of gravity of the lure 60 as a whole can be changed appropriately. Therefore, it is possible to maintain the flight attitude of the body 4 optimally in accordance with the condition of flight, and thereby extend the flight distance. Therefore, even if the casting force is low, the lure 60 can be efficiently flown over a long distance, which makes the lure 60 easy to use.

When the lure 60 lands on water, the weight portion 71 momentarily moves to the tail portion 11 side due to the impact from landing on the water, thereby elastically deforming the coil spring 72. However, the elastic restoring force of the coil spring 72 can be utilized to return the weight portion 71 quickly to the head portion 10 side after the lure lands on the water. As a result, the attitude of the lure 60 can be quickly stabilized, and the lure 60 immediately put into action via the line L. As a result, the lure 60 effectively can appear appealing to the target fish, increasing the hit rate after the lure lands on the water.

Further, since the lure 60 of the present embodiment includes the reflection mechanism 80, the lure is more appealing to the target fish.

That is, since the swinging part 81 can be swung so as to vibrate, for example, by an action, or the like, via the line L, it is possible to change the state of the light (reflected light) that is reflected by the reflector. Therefore, it is possible to change how the light appears and to make the lure 60 look as if the lure 60 is shining. As a result, the lure 60 can effectively be appealing to the target fish, increasing the hit rate with which target fish is hooked on the lure 60.

In particular, since the swinging part 81 is attached so as to be suspended via the coil spring 82, even when the action through line L stops, or the movement of the water or tide stops, the swinging part 81 does not immediately stop but rather a movable state (vibration) can be maintained. Therefore, it is possible for the lure to continue to appear appealing to the target fish, and to increase the hit rate.

Modified Example of the Second Embodiment

In the above-described second embodiment, the swinging part 81 is mounted so as to be suspended using the coil spring 82, but embodiments of the invention are not limited to this configuration; for example, the swinging part 81 can be attached to the body 4 so as to be movable, for example, by utilizing a pin, a ring, a suspension rod, or the like.

Further, in the above-described second embodiment, the interior of the body 4 can be set to a vacuum, for example, making the pressure negative relative to atmospheric pressure. Here, due to the negative pressure inside the body 4, since the swinging part 81 is less likely to be affected by air resistance, the swinging part 81 can be efficiently and more easily vibrated for a long time. As a result, it is possible for the lure to appear appealing to the target fish more effectively.

Further, in the second embodiment described above, a case in which both the center of gravity shifting mechanism 70 and the reflection mechanism 80 are incorporated inside the body 4 is described as an example, but it is not necessary to provide both, and a configuration in which only one mechanism is incorporated is also possible.

Although embodiments of the present invention have been described, these embodiments have been presented only as examples and are not intended to limit the scope of the invention. The embodiments can be implemented in a variety of other forms; furthermore, various omissions, substitutions and changes can be made without departing from the essence of the invention. Embodiments and modifications thereof include those that can be easily conceived of by a person skilled in the art, those that are essentially the same, and those that are of equivalent scope.

For example, in each of the embodiments described above, pencil bait type lures are described as an example, but a so-called minnow plug lure that has a lip portion in the jaw portion of the body can be used as well. Further, a dorsal fin, or the like, can be added to the back portion of the body.

Further, in the embodiments described above, a configuration in which the buffer member is provided on the tail portion side of the body is described as an example, but embodiments of the invention are not limited to this configuration, and the buffer member can be provided on the head portion side or the abdominal portion side. In this case, even if a large external force is applied to the line eye or the front hook eye, for example, the buffer member can be used to prevent the wire from pressing directly against the body, and the external force transmitted from the wire to the body can be relaxed and dispersed.

Further, in the embodiments described above a configuration in which the wire sandwiched between the first body and the second body in a state in which the wire is disposed continuously from the head portion to the tail portion via the abdominal portion of the body is described as an example, but embodiments of the invention are not limited to this configuration. For example, a wire having an eye can be individually attached to the head portion, to the abdominal portion, and to the tail portion of the body.

However, as in the embodiments described above, by configuring the wire to be arranged continuously from the head portion to the tail portion via the abdominal portion of the body, the wire can be sandwiched over a wide range by the first body and the second body, and the wire can be firmly attached to the body.

Further, in the embodiments described above the buffer member is configured in a cross-sectional C-shape by the first buffer portion, the second buffer portion, and the connecting portion, but the invention is not limited to this case. For example, the buffer member can include the first buffer portion and the second buffer portion. However, as in the embodiments described above, if the buffer member is composed of the first buffer portion, the second buffer portion, and the connecting portion, the buffer member can be treated as one part, thereby allowing, for example, the assembling of the lure to be performed efficiently.

What is claimed is:
1. A lure for fishing, comprising:
   a hollow body including a first body having a first bonding surface and a second body having a second bonding surface bonded to the first bonding surface, the body extending in a longitudinal direction and a lateral direction, the body having a length in the longitudinal direction which is longer than a width of the body in the lateral direction;

a wire having an eye to which a line or a hook is configured to be connected, and being integrally incorporated into the body; and an independent buffer member between the body and the wire, the wire being sandwiched between the first body and the second body with the buffer member interposed therebetween such that the eye is exposed to outside of the body, and is configured to move relative to the buffer member, and the buffer member in contact with both the first body and the second body, the buffer member having a first buffer portion and a second buffer portion facing each other across the wire, the wire arranged between the first buffer portion and the second buffer portion, and configured to bend at least in a vertical direction relative to the buffer member within a space between the first buffer portion and the second buffer portion, and the buffer member being an independent structural element formed from a material that is softer than a material of the body.

2. The lure according to claim 1, wherein
the buffer member has a connecting portion connecting the first buffer portion and the second buffer portion, and
the wire is disposed in the space surrounded by the first buffer portion, the second buffer portion, and the connecting portion.

3. The lure according to claim 1, wherein
the body includes at least one external communication hole surrounding at least a portion of the buffer member and exposing the eye to the outside from an interior of the body,
a first contacted surface facing the first buffer portion and a second contacted surface facing the second buffer portion are disposed on an inner surface of the at least one external communication hole,
a first contact surface contacts the first contacted surface and is formed on an outer surface of the first buffer portion, and
a second contact surface contacts the second contacted surface and is formed on an outer surface of the second buffer portion.

4. The lure 1 according to claim 1, wherein
the body has a head portion, an abdominal portion, and a tail portion, and
the buffer member is disposed in the tail portion.

5. The lure according to claim 4, wherein
the wire is sandwiched between the first body and the second body such that the wire is disposed from the head portion to the tail portion via the abdominal portion.

6. The lure according to claim 1, wherein
the buffer member is fixed to the body.

7. The lure according to claim 1, wherein
a swinging part is disposed inside the body and is movably attached to the body and has a reflector configured to reflect light from the outside, and
the body is configured such that light reflected from the reflector is capable of being seen from the outside.

8. The lure according to claim 7, wherein
the swinging part is attached to the body via an elastic member and is configured to vibrate with respect to the body.

9. The lure according to claim 1, further including
a weight portion disposed inside the body and being movable relative to the body, and a biasing member configured to elastically deform as the weight portion moves and to bias the weight portion by elastic restoring deformation, and
the weight portion is configured to move so as to elastically deform the biasing member at least at a time of casting.

10. The lure according to claim 1, wherein the wire is configured to bend in the lateral direction relative to the buffer member within the space between the first buffer portion and the second buffer portion.

* * * * *